Sept. 28, 1943.  G. E. LUNDBERG  2,330,296
POWER TRANSMITTING DEVICE
Filed Dec. 18, 1941
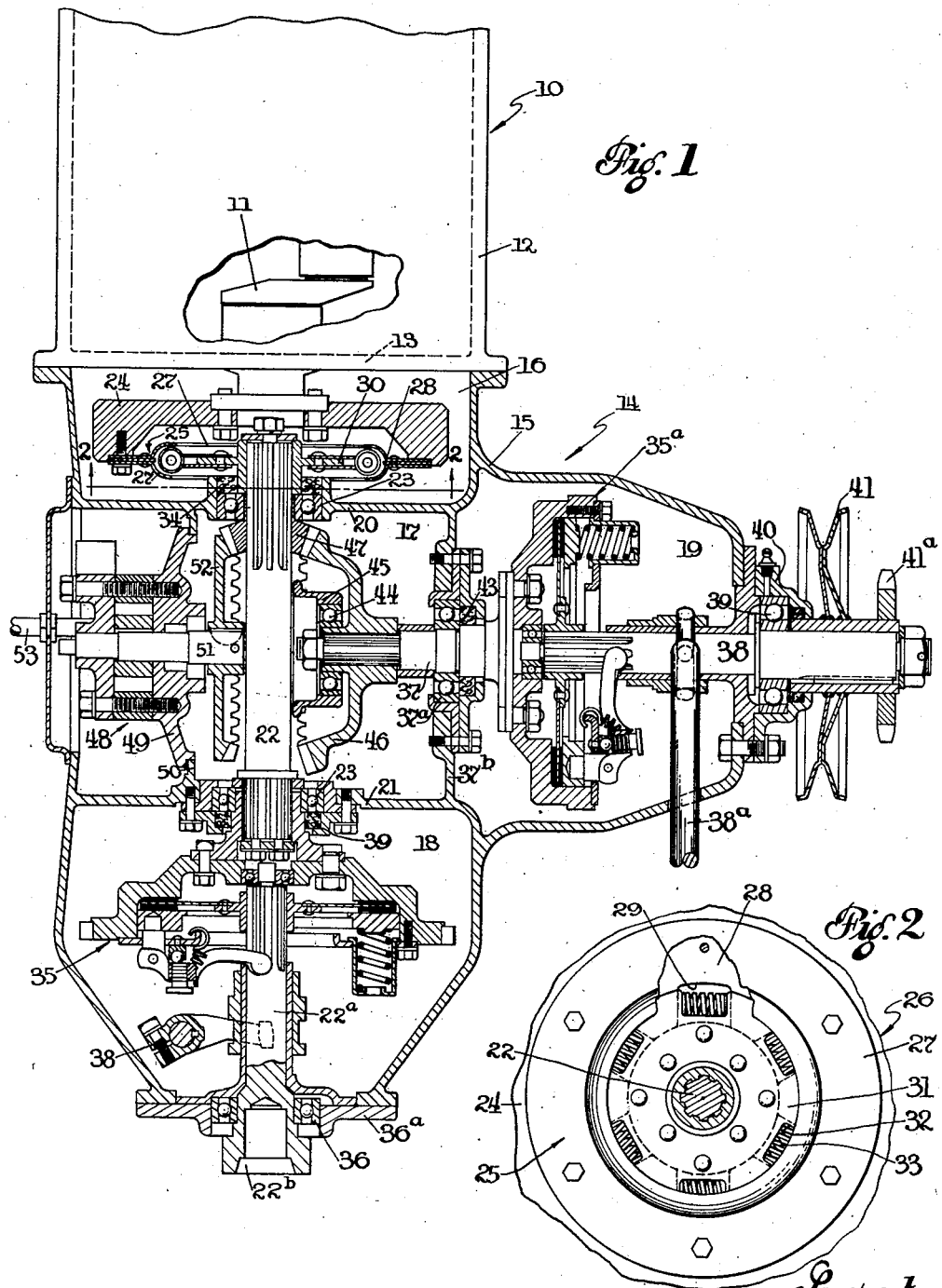
Inventor
Gustave E. Lundberg
By Paul O. Pippel
Atty.

Patented Sept. 28, 1943

2,330,296

UNITED STATES PATENT OFFICE

2,330,296

POWER TRANSMITTING DEVICE

Gustave E. Lundberg, Riverside, Ill., assignor to International Harvester Company, a corporation of New Jersey Application December 18, 1941, Serial No. 423,485

2 Claims. (Cl. 74—389)

This invention relates to a power transmitting device. More particularly it relates to a multiple power dividing or take-off device for motors.

In providing a motor on various machines, it is desirable many times to have multiple drives extending from the motor for driving various parts of the machine. In the present instance, it is desirable to have two power shafts coming from the motor. It is also desirable that independent clutch means be operatively connected with each of each of the power shafts for starting and stopping them.

It has been found, when driving a plurality of shafts from the crank-shaft or driving shaft of the motor, that a flexible engine coupling in the form of a torsional vibration absorbing means must be provided between the driving and driven shafts. One important purpose of this coupling is to compensate for misalinement of the shafts, both axially and angularly. It is extremely difficult, due to manufacturing variations, to position the driven shaft concentrically with the driving shaft and to finish the mating parts in which the shafts are journaled so that the driven shaft is not positioned at an angle to the driving shaft. The torsional vibration absorbing means also dampens out or reduces torsional vibrations set up by the driving shaft of the motor. These vibrations are set up in the crank-shaft or driving shaft of the motor by impulses imparted to the shaft in synchronism with the natural period of vibration of said shaft. These vibrations must be removed before the drive is transmitted from the driving shaft to the driven shafts, otherwise, the power dividing gearing, which drivingly connects said shafts and their bearings, will wear considerably. Ordinarily, the torsional vibration-absorbing means is built into the clutch that connects the driving and driven shafts. This, however, is not desirable when multiple drives are taken from the motor, since it is not necessary to have a clutch at this point.

It is an important object of the present invention to provide a novel multiple shaft power dividing or take-off device for a motor. In this connection, it is another object of the present invention to provide independent clutch means for operating the multiple shafts and to position the clutch means in the motor to insure their efficient operation.

Another object of the present invention is to mount the power dividing device in a housing which may be easily attached to a standard type motor or engine.

Another object of the present invention is to provide the housing with a plurality of compartments in which the power dividing gearing and the clutches may be mounted.

Another object of the present invention is to provide a hydraulic pump means in the housing, the pump means being driven from one of the driven shafts.

By virtue of these particular features, a compact, yet efficient, multiple shaft power divider is provided for motors.

According to the present invention, a housing having a plurality of wet and dry compartments is carried by the motor. In the housing a plurality of driven shafts are journaled. One of the driven shafts is operatively connected to the motor-driver shaft by a flexible engine coupling in the form of a vibration dampening means. Gearing connects the journaled shafts with the driven shaft. Independent clutch means are provided for each of the journaled shafts. The clutch means and the dampening means are positioned in a dry compartment, and the gearing is positioned in a wet compartment. A hydraulic pump means is also positioned in the wet compartment and is driven from one of the journaled shafts.

These and other objects and advantages of the present invention will be apparent to those skilled in the art after a consideration of the following detailed description of the preferred structural embodiment, taken in conjunction with the accompanying drawing.

In the drawing:

Figure 1 is a horizontal sectional view of the novel power transmitting device; and Figure 2 is a sectional view taken along the line 2—2 of Figure 1 and illustrates the construction of the engine coupling means.

Referring to Figure 1, it is to be noted that the illustrated embodiment of the present invention comprises a motor or engine 10, from which extends a crankshaft 11 which is, in effect, a driving shaft. The engine 10 includes the usual motor block 12 at the rear end of which is provided a vertical wall 13 through which the crank-shaft 11 extends. The power transmission device, in this case, is secured to the rear end of the block 12 adjacent the vertical rear wall 13.

The power transmission device, represented in its entirety by the numeral 14, comprises a housing 15 which consists of a plurality of compartments 16, 17, 18, and 19. The compartments 16, 17, and 18 are in alinement with one another, and the compartment 19 is positioned at one side of the compartment 17. As previously mentioned, the driving shaft 11 extends from the vertical rear wall 13 into the compartment 16. In the vertical walls 20 and 21 provided within the housing 15 a first shaft 22 is journaled at each of its ends in suitable bearings 23 carried by the walls 20 and 21. On the rear end of the driver shaft 11 is secured a fly-wheel 24 at the rear of which is bolted the retaining means 25 of an engine coupling and vibration dampener 26. The retaining means 25 comprises spaced plate members 27 and an inner plate member 28 which is provided with a plurality of equally spaced internal reentrant portions 29. On the forward end of the shaft 22 is secured a radially extending member 30, at each side of which is secured a plate member 31 in the periphery of which is provided a plurality of equally spaced external reentrant portions 32. As shown in the drawing, the plate 31 is positioned between the plates 27, and a spring 33 is positioned between each of the reentrant portions 32 of the plate 31 and the reentrant portions 29 of the plate 28. The vibration dampening means 26 reduces all the torsional vibrations set up by the driving shaft 11 so that a steady, even flow of power may be applied to the shaft 22. A seal 34 is provided at the forward end of the shaft 22, so that the compartment 16 may always remain a dry compartment.

In the compartment 18 is positioned a manually controlled clutch means 35 which is secured to the end of the shaft 22. In the clutch means 35 and in axial alinement with the shaft 22 is journaled a second shaft 22a, the rear end of which is journaled in a bearing 36 carried by a suitable bracket member 36a secured to the rear of the compartment 18. The shaft 22a extends beyond the bracket member 36a and is provided with a reentrant portion 22b which may be operably connected to a part that is to be driven. The clutch means 35 is controlled by a manually controlled means 38. A seal 39 is provided adjacent the rear end of the shaft 22 so that the clutch 35 may operate within the dry compartment 18.

Within the compartment 19 is positioned another manually controlled clutch 35a which is secured to the end of a third shaft 37 that is journaled in a bearing 37a positioned in the wall 37b of the housing 15. In the end of the clutch 35a and in axial alinement therewith is journaled a fourth shaft 38. The shaft 38 extends out of the compartment 19, and at its outer end is journaled in a suitable bearing 39 carried by a bracket 40 which is secured to the outer end of the compartment 19. On the end of the shaft 38 is provided a suitable pulley 41 and a sprocket 41a which may be operably connected to another part that is to be driven. The clutch 35a is likewise controlled by a manual control means 38a. A seal 43 is provided between the wall 37b and the shaft 37 so that the clutch 35a may operate within the dry compartment 19.

The shaft 37 extends into the compartment 17 and is journaled in a suitable bearing 44 that is carried by a portion 45 extending from the compartment 17. On the shaft 37 is secured a bevel gear 46 which is adapted to mesh with a bevel gear 47 secured on the forward end of the shaft 22. A hydraulic pump means 48 is positioned within the compartment 17 and is carried by a suitable member 49 that is bolted to an internal wall 50. A shaft 51 extends from the hydraulic pump means 48, and a bevel gear 52 is secured thereto, which gear is adapted to operably engage the bevel gear 47. A conduit 53 extends from the hydraulic pump means 48 and may be connected to any suitable fluid power device. Since the gears 46, 47, and 52 operate within the compartment 17 and since the hydraulic pump means 48 is located within the compartment 17, it is necessary that this compartment have a suitable lubricant provided therein for lubricating the gears. Inasmuch as the compartment 17 is quite large, the lubricant therein may also be used for the hydraulic pump means 48.

By virtue of this novel arrangement of parts, a multiple power dividing device can be efficiently and economically provided for a motor which is to be adapted for driving various parts of the machine. The vibration dampening means 26 removes the torsional vibrations of the driving shaft 11 and supplies a steady flow of power to the journal shafts 22, 37, and 51. In this way, the gearing and its bearings will have much longer life.

The novel power transmitting device described above is particularly useful on self-propelled harvester threshers. In this case, the main wheels of the harvester thresher are driven by the shaft 22a; the separator and platform are driven from the pulley 41 and the sprocket 41a; and the platform is raised and lowered by a fluid cylinder device that is operated by the hydraulic pump means 49.

While only a preferred structural embodiment of the present invention has been shown and described, it is to be understood that the invention is not to be limited to the specific details shown and described, but that, in effect, widely different means may be employed in the broader aspects of the invention.

What is claimed is:

1. In a power transmission for use upon a motor-driven vehicle having propelling means and equipped with an auxiliary means drivable from the vehicle motor, the combination of a bell housing comprising integrally-formed front, intermediate, rear, and side compartments of which the intermediate compartment is separated from the front and rear compartments by front and back and transverse walls respectively and separated from the side compartment by a side wall, all of said walls also being integral parts of such housing and having bearing openings therein, said rear and side compartments having back and side clutch-shaft-receiving wall openings in opposed coaxial relation respectively with the back and side wall openings, a coupling shaft extending axially through the intermediate compartment and through the openings in said front and back transverse walls wherein it is journaled to dispose front and back end portions respectively in the front and back compartments, means in the front compartment for connecting the front end portion of said shaft to the motor for rotation therefrom, a power take-off shaft extending through and journaled in the side wall opening to present inner and outer end portions respectively within the intermediate and side compartments, a gear train in the intermediate compartment for driving the power take-off shaft from said coupling shaft, a main clutch shaft extending across the back compartment coaxially with the coupling shaft and having a forward end portion journaled in piloted relation with said coupling shaft and a rearward portion journaled in the back clutch-shaft-receiving opening, an auxiliary clutch shaft extending across the side compartment coaxially with the power take-off shaft and having an inner end portion journaled in piloted relation with said power take-off shaft and an outer portion journaled in the side clutch-shaft-receiving opening, said main and auxiliary clutch shafts being drivable to respectively drive the vehicle propelling means and the auxiliary drivable means, a main clutch in the rear compartment for releasably drivingly connecting said coupling shaft with the main clutch shaft, and an auxiliary clutch in said side compartment for releasably drivingly connecting said power take-off shaft with the drivable auxiliary means.

2. The combination set forth in claim 1, but wherein the connecting means within the front compartment is flexible to increase the practical tolerance of misalinement between the coupling shaft and motor.

GUSTAVE E. LUNDBERG.

CERTIFICATE OF CORRECTION.

Patent No. 2,330,296. September 28, 1943.

GUSTAVE E. LUNDBERG.

It is hereby certified that error appears in the printed specification of the above numbered patent requiring correction as follows: Page 2, second column, line 47, claim 1, strike out "and" second occurrence; and that the said Letters Patent should be read with this correction therein that the same may conform to the record of the case in the Patent Office.

Signed and sealed this 7th day of December, A. D. 1943.

(Seal)

Henry Van Arsdale,
Acting Commissioner of Patents.